Patented June 17, 1930

1,765,287

UNITED STATES PATENT OFFICE

MURRAY R. SCOTT, OF ROCHESTER, NEW YORK, ASSIGNOR TO BAUSCH & LOMB OPTICAL CO., OF ROCHESTER, NEW YORK, A CORPORATION OF NEW YORK

OPTICAL GLASS

No Drawing.   Application filed June 11, 1928. Serial No. 284,653.

My invention relates to an improvement in the composition of optical glasses known generally as dense barium crown glass. The refractive index of this type of glass generally varies from 1.56 to 1.63 and the dispersion, as expressed by "$\nu$" (Greek letter nu), generally varies from 40 to 64.

It is well known that dense barium crown glass will tarnish on the surface when exposed to severe atmospheric conditions. This tarnish usually appears as spots or discolorations on the surface of the glass and in bad cases it causes an iridescent effect on the surface. This type of glass is used in a variety of optical products, such as for example, in field glasses, photographic objectives, and fused bifocal lenses. This surface tarnishing, therefore, presents a very serious and objectionable defect since it greatly impairs the optical performance of the instrument or device in which lenses made of this type of glass are used.

One of the objects of the present invention is to provide an improved optical glass; another object is to provide a dense barium crown glass that will be resistant to tarnishing.

I have discovered that by using zirconium in a barium crown glass batch the resistance to tarnishing, under atmospheric exposure, will be greatly increased. This is accomplished by substituting not over 5% of zirconium oxide for an equivalent part of the zinc oxide or other materials that are found in a batch for a glass of the character described.

An example of a glass batch which will provide a dense barium crown glass, which will resist tarnishing, has the following composition:

| | Per cent |
|---|---|
| Silica | 38.57 |
| Lithium oxide | 1.00 |
| Potassium oxide | 1.67 |
| Calcium oxide | 5.22 |
| Barium oxide | 36.16 |
| Lead oxide | .93 |
| Zinc oxide | 4.94 |
| Boric oxide | 6.75 |
| Arsenic oxide | .73 |
| Antimony oxide | 1.03 |
| Zirconium oxide | 3.00 |
| | 100.00 |

Although in the above formula I have shown the zirconium added as an oxide, it is to be understood that it may be added in other forms or compounds. In the above example the zirconium oxide has been substituted for a part of the zinc oxide. Thus the zinc oxide has been reduced 3.00% and 3.00% of zirconium oxide has been added. The zirconium may be similarly substituted for other materials in the batch. In some cases when the zirconium oxide is substituted for the zinc oxide, there is a tendency to raise the refractive index of the resulting glass.

I claim as my invention.

1. A dense barium crown optical glass which is resistant to tarnishing comprising over 25 percent of barium and under 5 percent of a zirconium compound.

2. A barium glass suitable for optical purposes having a refractive index between 1.56 and 1.63 and a dispersion as expressed by $\nu$ between 40 and 64 and comprising in its composition a sufficient amount of a zirconium compound to render the glass resistant to tarnishing.

3. A dense barium crown optical glass comprising a sufficient amount of a zirconium compound to render the glass resistant to tarnishing.

MURRAY R. SCOTT.